No. 847,597. PATENTED MAR. 19, 1907.
P. ONSUM & H. R. DOHREN.
GOVERNOR.
APPLICATION FILED JAN. 12, 1906.
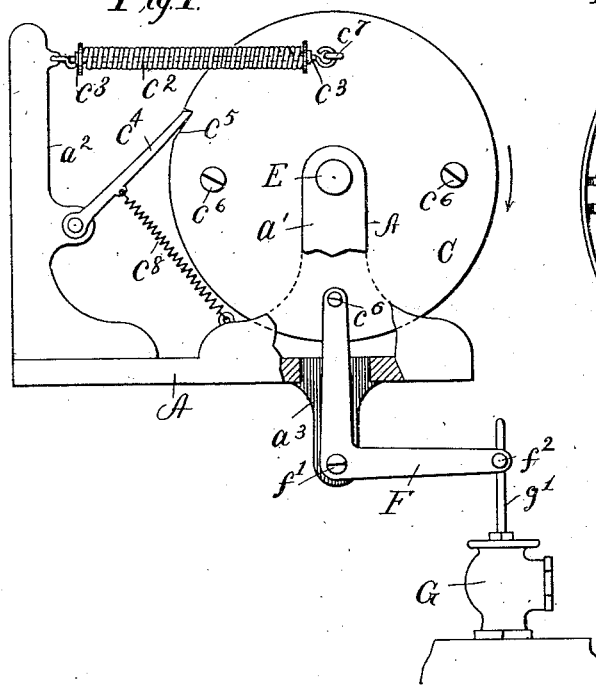
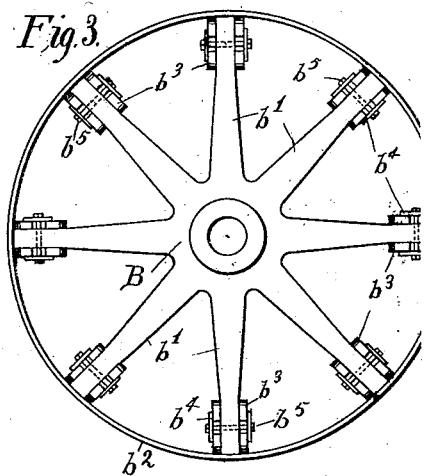
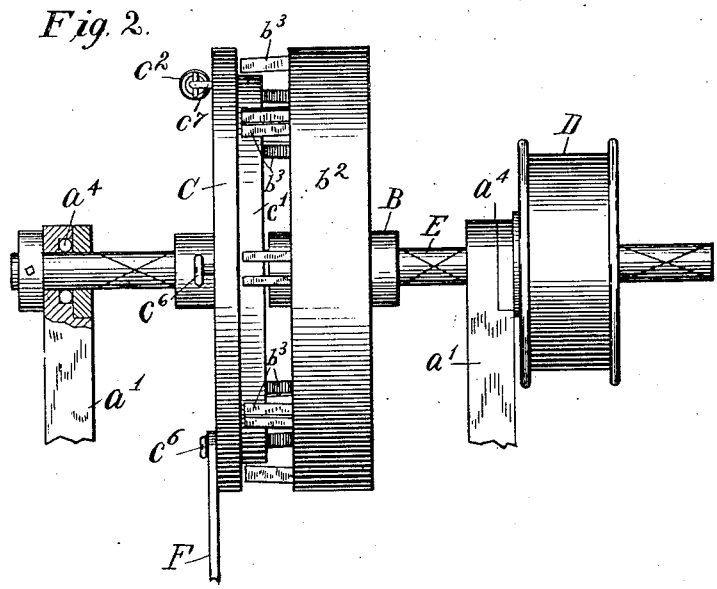
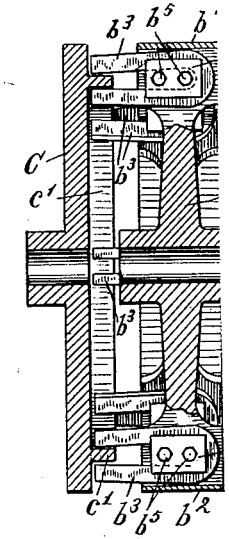
Witnesses:
Chas. F. Bassett
M. A. Milord
Inventors
P. Onsum
H. R. Dohren
By Frederick Benjamin
Atty.

UNITED STATES PATENT OFFICE.

PETER ONSUM, OF JACKSON, TENNESSEE, AND HENRY RICHARD DOHREN, OF CHAMPAIGN, ILLINOIS.

GOVERNOR.

No. 847,597.   Specification of Letters Patent.   Patented March 19, 1907.

Application filed January 12, 1906. Serial No. 295,708.

*To all whom it may concern:*

Be it known that we, PETER ONSUM and HENRY RICHARD DOHREN, citizens of the United States, residing, respectively, at Jackson, in the county of Madison and State of Tennessee, and Champaign, in the county of Champaign and State of Illinois, have invented certain new and useful Improvements in Governors, of which the following is a specification.

This invention relates to a speed and stroke governor which is adaptable to various uses, and comprises mechanical and magnetic elements which coöperate in effecting the desired results. For the purpose of showing clearly the adaptability of our invention, we have illustrated it in this application for patent in connection with the stem of an ordinary balanced valve.

The accompanying drawings are intended to illustrate the principles of our invention. Hence we reserve the right to make various changes in the mechanical details in the arrangement of parts and in the substitution of mechanical equivalents for some of the parts shown.

The primary object of our invention is to provide governing means which will take the place of the ordinary ball-governors or any other form of governor which acts through gravity or centrifugal force by substituting magnetic force therefor.

In the accompanying drawings, which form a part of this application, Figure 1 is a view in side elevation, showing our invention. Fig. 2 is an edge view showing the manner of mounting our governor, the scale being somewhat larger than that shown in Fig. 1. Fig. 3 is a plan view of the spider-wheel which forms an element of our apparatus. Fig. 4 is a vertical section through the principal parts of our governor.

Referring to the details of the drawing, A represents a supporting-bracket which is formed with upright portions $a'$ $a'$ and with pendent portion $a^3$ and has secured thereto a standard $a^2$. Journaled in the uprights $a'$ is a shaft E, for which ball-bearings are preferably provided. On the shaft a pulley D is mounted, which may be belted to any suitable source of power and preferably driven from the crank-shaft by belt, chain, or gears.

Between the uprights $a'$ a spider-wheel B is mounted on the shaft E. This wheel is formed with a suitable hub with radial spokes $b'$ and an annular rim $b^2$. Secured to opposite sides of each of the spokes by plates $b^4$ and bolts $b^5$, the latter passing through suitable openings in the spokes, are two horseshoe-magnets $b^3$, so arranged that their poles extend at right angles to one side of the wheel.

Loosely mounted on the shaft E is a Norway-iron disk C, corresponding in diameter to the wheel B. This disk on its face adjacent to the wheel B is formed with an annular flange $c'$, which is arranged between the poles of the magnets and within their magnetic field.

$c^2$ represents an expansion coil-spring, which is provided with tension-adjusting nuts $c^3$, which engage the ends of a rod which passes through the spring. One end of the spring is secured to the standard $a^2$ and the other end to an eyebolt $c^7$, secured in the outer face of the disk, as clearly shown in Fig. 1.

Pivoted on the standard $a^2$ is a pawl $c^4$, the free end of which engages a notch $c^5$ in the periphery of the disk, thus preventing the latter from moving backwardly. A spring $c^8$, secured to the pawl and the support A, respectively, serves to hold the pawl in close engagement with the periphery of the disk.

F is a crank-lever which is pivotally mounted on a pin $f'$ in the pendent lug $a^3$ and has one arm connected to one of the pins $c'$ in the face of the disk. The other arm of the crank is pivoted by pin $f^2$ to the stem $g'$ of the valve G.

In a governor constructed substantially as described the rotation of the spider wheel or pulley, with its drive-shaft, will produce rotating magnetic field which will have a tendency to carry the disk with it against the tension of the spring $c^2$, and thus operate the crank E, cut-off rods, or any other elements connected with the disk by any or all of the pins $c^6$. The resistance of the magnetic field and the tension of the spring will be increased in exact ratio with the speed of the engine on which our governor is used.

It will be apparent that we may substitute electromagnets for the permanent magnets shown and that the form or arrangement of tension-spring on the disk C may be varied without departing from the essential features of our invention.

What we claim, and desire to obtain by Letters Patent, is—

1. In a governor of the class described, a rotatable wheel, magnets secured to said wheel, a disk rotatably mounted in close proximity to said wheel and having a portion extending into the field of said magnets and a tension device attached to said disk, and adapted to resist the rotation of the disk.

2. In a governor of the class described, a rotatable wheel, magnets secured to said wheel, a disk rotatably mounted in close proximity to said magnets and adapted to be affected thereby, yielding means for resisting the rotation of said disk, and means for preventing the backward movement of said disk.

In testimony whereof we affix our respective signatures in presence of two witnesses.

PETER ONSUM.
HENRY RICHARD DOHREN.

Witnesses as to signature of Peter Onsum:
OLIVER BENTON,
B. S. MATTHEWS.

Witnesses as to signature of Henry Richard Dohren:
J. D. HECKMAN,
E. E. FAST.